United States Patent [19]

Cole, Jr.

[11] 3,936,318

[45] Feb. 3, 1976

[54] ELECTRICAL ENERGY STORAGE BATTERY MEANS

[75] Inventor: Charles F. Cole, Jr., Ponca City, Okla.

[73] Assignee: Continental Oil Company, Ponca City, Okla.

[22] Filed: Jan. 13, 1975

[21] Appl. No.: 540,616

[52] U.S. Cl. .............................. 136/6 R; 136/153
[51] Int. Cl.² ......................................... H01M 10/00
[58] Field of Search ........... 136/6 R, 83 R, 153–155

[56] References Cited
UNITED STATES PATENTS
3,652,339   3/1972   Grulke ............................ 136/154 X

*Primary Examiner*—T. Tung
*Assistant Examiner*—C. F. Lefevour
*Attorney, Agent, or Firm*—F. Lindsey Scott

[57] ABSTRACT

An improved electrical energy storage battery is provided having a case, at least two porous electrolyte containers positioned within the case, a solid hydrogel positioned within the case and between the electrolyte containers, the hydrogel containing an effective amount of an electron transferring agent to render said hydrogel conductive, at least one anode positioned within at least one of the electrolyte containers, at least one cathode positioned within at least one other of the electrolyte containers, a second solid hydrogel positioned within the container for the cathode, said gel being saturated with a compound selected from the group consisting of zinc chloride, zinc oxide, cadmium chloride, and cadmium oxide to render same conductive, and a third solid hydrogel positioned within the container for the anode, said gel being saturated with a compound selected from the group consisting of chromium chloride, chromium oxide, and alkali metal-containing chromate salts to render same conductive. The electron transferring agent employed in the solid hydrogel is selected from alkali metal salts, alkali metal hydroxides, alkaline earth metal salts, and alkaline earth metal hydroxides.

8 Claims, 3 Drawing Figures

ELECTRICAL ENERGY STORAGE BATTERY MEANS

BACKGROUND OF THE INVENTION

The present invention relates to an improved electrical energy storage battery. In one aspect, the invention relates to an improved storage battery which is readily rechargeable. In normal battery operation, it is difficult to employ, in currently used systems, a solid electrolyte since it is necessary to keep the electrolyte in close contact with the electrode to be oxidized. Further, in most of the electrical storage batteries of the prior art, relatively expensive metals are employed as the various electrode components. Further, the design of such batteries has not enabled one to produce a high voltage output while maintaining a low current output. Thus, a need has long been known for an improved electrical energy storage battery which provides a higher voltage output than the traditional lead-acid battery, which is rechargeable, which can be produced from inexpensive materials, and, which has a low current output.

SUMMARY

In accordance with this invention, an improved rechargeable electrical energy storage battery is provided in which the electron transferring medium is maintained in a substantially solid state. In addition, the battery of the present invention produces improved voltage at substantially lower current than the conventional batteries known heretofore.

The improved electrical energy storage battery of the present invention comprises:

a. a case means;

b. at least two porous electrolyte container means positioned within said case means;

c. a solid hydrogel positioned within said case means and between said electrolyte container means, said hydrogel containing an effective amount of an electron transferring agent to render said hydrogel conductive;

d. at least one anode means positioned within at least one of said electrolyte container means;

e. at least one cathode means positioned within at least one other of said electrolyte container means;

f. a second solid hydrogel prositioned within said container means for said cathode, said gel being saturated with a compound selected from the group consisting of zinc chloride, zinc oxide, cadmium chloride and cadmium oxide to render same conductive; and, g. a third solid hydrogel positioned within said container means for said anode, said gel being saturated with a compound selected from the group consisting of chromium chloride, chromium oxide, and alkali metal containing chromate salts to render same conductive.

OBJECTS OF THE INVENTION

An object of the present invention is to provide an improved electrical energy storage battery.

Another object of the present invention is to provide an improved electrical energy storage battery which can readily be recharged and does not suffer from the deficiencies of the prior art batteries.

Another object of the present invention is to provide an improved electrical energy storage battery which produces an improved voltage output while maintaining a low current output.

These and other objects, advantages, and features of the present invention will become apparent to those skilled in the art from the reading of the following detailed description.

BRIEF DESCRIPTION OF THE DRAWINGS

Drawings accompany and are part of this disclosure. These drawings depict preferred specific embodiments of the improved electrical energy storage battery means of the invention, and it is to be understood that the drawings are not to unduly limit the scope of the invention. In the drawings.

In the following discussion and description of the invention reference will be made to the drawings wherein the same referenced numerals will be used to indicate the same or similar parts and/or structure. The discussion and the description is of specific embodiments of the improved electrical energy storage battery of the invention, and it is to be understood that the discussion and the description is not to unduly limit the scope of the invention.

Figure 1:
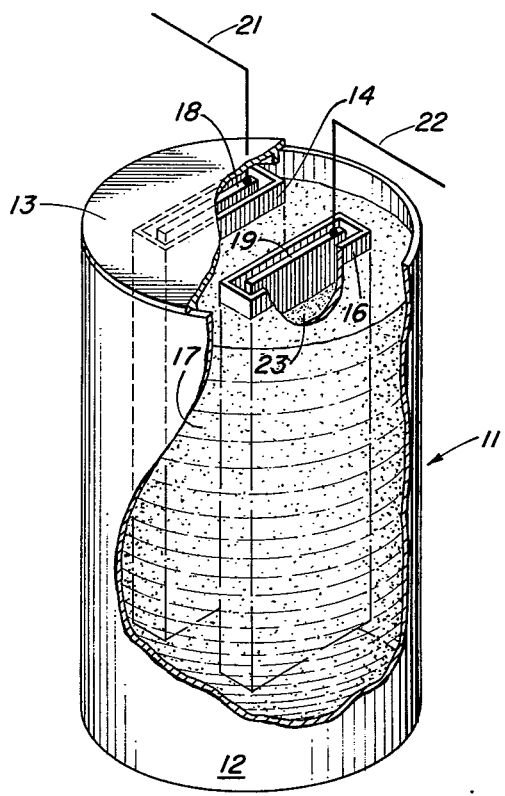
FIG. 1 is a partially broken prospective view of the improved electrical energy storage battery of the present invention.
Figure 2:
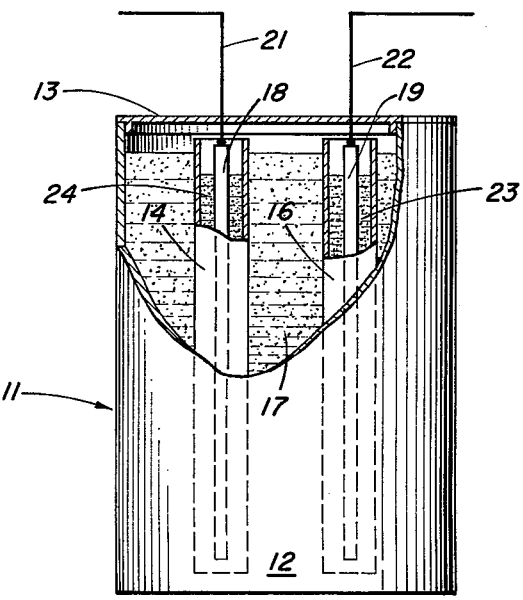
FIG. 2 is a partially broken plain elevational view of the electrical energy storage battery of FIG. 1.

Referring now to all the drawings and particularly to FIGS. 1 and 2, an embodiment of the improved electrical energy storage battery 11 of the present invention is shown. Battery 11 comprises a case member 12 and a cover member 13. Case member 12 has positioned therein two porous electrolyte containers 14 and 16. Porous containers 14 and 16 are positioned inside case 12 which also contains a solid hydrogel 17 which separates containers 14 and 16. An anode means 18 and a cathode means 19 are positioned in electrolyte containers 14 and 16 respectively. Anode means 18 and cathode means 19 are connected to electrical connectors 21 and 22 which are in electrical contact with an external load not shown. Container 16 containing cathode 19 contains a second solid hydrogel 23. Porous container 14 containing anode 18 contains a third hydrogel 24.

Hydrogel 17 positioned inside case 12 and between electrolyte containers 14 and 16 contains an effective amount of an electron transferring agent to render hydrogel 17 electrically conductive so that electrons can pass between anode 18 and cathode 19. While any suitable electron transferring agent can be employed to render hydrogel 17 conductive, it is desired in the unique battery of the present invention, that such transfer agent be selected from the group consisting of alkali metal salt, alkali metal hydroxide, alkaline earth metal salt, and alkaline earth metal hydroxide. Examples of such transfer agents are sodium chloride, potassium chloride, lithium chloride, sodium hydroxide, potassium hydroxide, lithium hydroxide, calcium chloride, barium chloride, and calcium hydroxide and barium hydroxide. While the amount of transfer agent employed in the hydrogel can vary widely, I have found that desirable results can be obtained when the amount of transferring agent employed with hydrogel 17 varies from about 20 to 70 weight percent of said transfer agent.

The term hydrogel as used herein is understood to means those compounds which when admixed with warm water dissolve therein and upon cooling, form a solid gel. Such compounds are illustrated by the following group: agar-agar, water glass, hydroxymethylcellulose, hydroxyethylcellulose, modified cellulose, flour, starch and the like. While any of the above can be employed, especially desirable results from a physical property standpoint are obtained when the hydrogel is selected from the group consisting of agar-agar, water glass, hydromethylcellulose, hydroxyethylcellulose, and modified cellulose.

In addition to the electron transfer agent employed in hydrogel 17 positioned between containers 14 and 16, it is often desirable to incorporate into hydrogel 17 an effective amount of graphite powder. By employing such graphite powder the life of the cell is improved. Such is believed to be primarily due to the lower internal resistance present in the cell when the graphite powder is incorporated along with the electron transfer agent into the solid hydrogel. While the amount of graphite can vary widely, desirable results are obtained when from about 2 to 8 weight percent of graphite is incorporated into hydrogel 17.

As previously stated, at least two porous electrolyte containers 14 and 16 are positioned inside case 12 of battery 11. Porous electrolyte container 16 containing cathode means 19, is adapted to have positioned therein a solid hydrogel 23, said gel being saturated with a compound selected from the group consisting of zinc chloride, zinc oxide, cadmium chloride, and cadmium oxide, such compounds being important to render the gel conductive so that electrons can flow therethrough into contact with conductive hydrogel 17 positioned between electrolyte containers 14 and 16.

Electrolyte container 14 containing anode 18, is likewise provided with solid hydrogel 24 positioned within said container, said gel being saturated with a compound selected from the group consisting of chromium chloride, chromium oxide, and alkali metal containing chromate salts, such being required to render the hydrogel condutive to electron transfer. When desirable, an effective amount of graphite can be incorporated into the hydrogen positioned in electrolyte container 14 containing anode 18. While the amount of such graphite can vary widely, desirable results are obtained wherein the amount of graphite incorporated into the hydrogel 24 varies from about 2 to 8 weight percent.

Porous electrolyte containers 14 and 16, which can be employed in equal numbers, i.e., 2, 4, 6, 8 and the like, or in odd numbers (see FIG. 3) can be produced of any suitable material which will serve as a flow barrier between the various hydrogel compositions. However, such barriers must be porous so that charged particles such as ions, electrons and the like can readily flow between anode 18 and cathode 19 of the battery 11. Examples of suitable materials which can be employed for the porous electrolyte container means are microporous polymeric materials such as polyethylene, polypropylene, polyvinyl chloride, and the like and ceramic materials such as microporous porcelain containers.

In the battery means of the present invention, many types of material can be employed as the anode and the cathode. However, especially desirable results have been obtained when such are formed of graphite.

Figure 3:
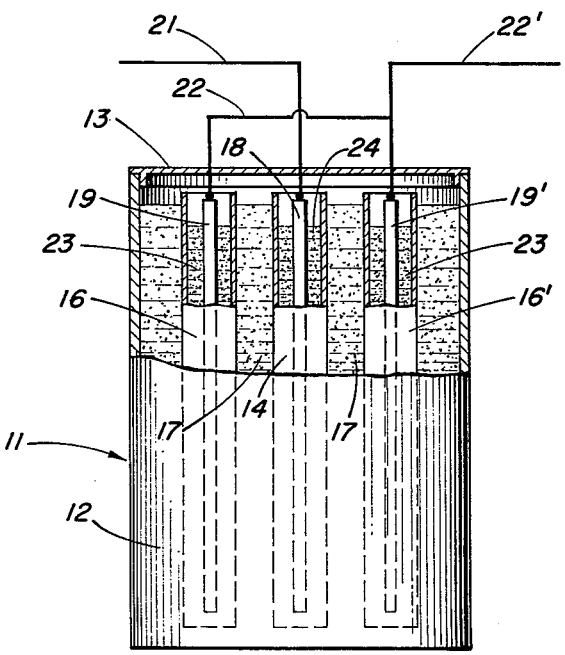
FIG. 3 is a partially broken prospective view of a second embodiment of the improved electrical storage battery of the present invention.

Referring now to FIG. 3, a second embodiment of the electrical energy storage battery of the present invention is depicted.

Improved electrode storage battery 11 comprises a case member 12 and a cover member 13. Case member 12 has positioned therein three porous electrolyte containers 14, 16 and 16'. Containers 14, 16 and 16' are positioned inside case means 12 and are separated by a solid hydrogel 17 which is also positioned inside casing means 12. Anode 18 and cathodes 19 and 19' are positioned in containers 14, 16, and 16', respectively. Anode 18 and cathode 19 and 19' are connected to electrical connectors 21, 22 and 22', respectively. The electrical connectors are in electrical contact with an external power source not shown for charging battery 11 or an external load. As illustrated, cathode 19 and 19' are optionally connected in series with each other. Porous containers 16 and 16' contain a second solid hydrogel 23. Porous container 14 contains a third hydrogel 24.

Hydrogel 17, positioned within case member 12 and between electrolyte containers 14, 16 and 16' contains an effective amount of electron transferring agent to render said hydrogel conductive so that electrons can pass from between the anode and the cathode. While any suitable electron transferring agent can be employed to render the hydrogel conductive, it is desired in the unique battery of the present invention, that such transfer agent be selected from the group consisting of alkali metal salt, alkali metal hydroxide, alkaline earth metal salt, and alkaline earth metal hydroxide. Examples of such transfer agents are sodium chloride, potassium chloride, lithium chloride, sodium hydroxide, potassium hydroxide, lithium hydroxide, calcium chloride, barium chloride, and calcium hydroxide and barium hydroxide. While the amount of transfer agent employed in the hydrogel can vary widely, I have found that desirable results can be obtained when the amount of transferring agent employed with said hydrogel varies from about 20 to 70 weight percent of said transfer agent.

In addition to the electron transfer agent employed in the solid hydrogel position between porous electrolyte containers 14, 16 and 16' it is often desirable to incorporate into said hydrogel an effective amount of graphite powder. By employing such graphite powder the life of the cell is improved. Such is primarily believed to be due to the lower cell internal resistance present when the graphite powder is incorporated along with the electron transfer agent into the solid hydrogel. While the amount of graphite can vary widely, desirable results are obtained when about 2 to 8 weight percent of graphite is incorporated into the hydrogel.

As previously stated, the three porous electrolyte containers 14, 16 and 16' are positioned within case 12 of battery 11. Porous electrolyte containers 16 and 16' containing cathodes 19 and 19' are adapted to have positioned therein a solid hydrogel 23, said gel being saturated with a compound selected from the group consisting of zinc chloride, zinc oxide, cadmium chloride, and cadmium oxide, such compounds being important to render the gel conductive so that electrons can flow there through into contact with conductive hydrogel 17 position between electrolyte containers 14, 16 and 16'.

Electrolyte container 14 containing anode 18, is likewise provided with solid hydrogel 24 positioned within container 14, the gel being saturated with a compound selected from the group consisting of chromium chloride, chromium oxide, an alkali metal containing chromate salts, such being required to render the hydrogel conductive to electron transfer. When desirable, an effective amount of graphite can be incorporated into the hydrogel positioned within the electrolyte container 14 containing anode 18. While the amount of such graphite can vary widely, desirable results are obtained wherein the amount of graphite incorporated into the hydrogel varies from about 2 to 8 weight percent.

In order to better illustrate the operation and efficiency of the improved electrical energy storage means of the present invention, the following Examples are set forth. However, it is to be understood that the Examples are for illustrative purposes only and are not intended to limit the scope of the invention.

EXAMPLE I

A battery was constructed similar to FIGS. 1 and 2. Porous procelain containers, having dimisions of 9 cm × 7 cm × 2 cm were employed as the electrolyte container means. Carbon plates were utilized as both the anode and cathode. The hydrogel employed between the porcelain containers was an agar gel saturated with sodium chloride. The hydrogel employed in the procelain container containing the anode was an agar gel saturated with chromium chloride. The hydrogel employed in the porcelain container containing the cathode was an agar gel saturated with zinc chloride. The battery was attached to an external power source and electrically charged at 0.6 amperes for 4 hours. After the 4 hour charge the power source was removed and measurements made on the battery. These measurements are as follows:

| | |
|---|---|
| Open circuit | 2.457 volts |
| Short circuit | 2.0 amperes |
| Battery and Short Circuit Resistance | 1.228 ohms |

Measurements were then made to determine the battery open circuit voltage over a period of about 4 hours. The data is as follows:

| Voltage (volts) | Time (minutes) | |
|---|---|---|
| 2.139 | 0 | |
| 2.129 | 23 | |
| 2.125 | 34 | |
| 2.108 | 113 | |
| 2.104 | 144 | |
| 2.098 | 178 | |
| 2.094 | 198 | |
| 2.085 | 243 | |
| 2.083 | 248 | |

| Load Voltage (volts) | Current (Milliamperes) | Time (Minutes) |
|---|---|---|
| 1.635 | 72 | 0 |
| 1.335 | 60 | 10 |
| 1.268 | 57 | 60 |
| 1.262 | 57 | 87 |
| 1.258 | 56.5 | 105 |
| 1.252 | 56 | 133 |
| 1.250 | 56 | 145 |
| 1.208 | 54.5 | 340 |

All of the above data was collected at 72° F.

EXAMPLE II

A battery was constructed similar to the one depicted in FIG. 3. In this battery three porous porcelain containers similar to those of Example I were employed. The hydrogel employed between the containers was an agar gel containing about 25 weight percent NaCl and about 4 weight percent graphite powder. One porcelain container was used to house the anode and two porcelain containers were used to house the cathodes. The hydrogel employed in the procelain container containing the anode was saturated with chromium chloride. Thereafter, about 3 weight percent of graphite powder was incorporated into the chromium chloride saturate agar solution. The hydrogel employed in the two porcelain containers containing the cathodes was an agar gel saturated with zinc chloride.

Once the battery was constructed it was charged with an external power source for 3 hours at 2 amperes. No short circuit cycling was used during the charging operation. Tests were then made on the charged battery over a 300 minute interval to determine the amount of discharge of the battery. The load imposed on the battery was 12 OHMS. The data measured is as follows:

| Voltage (volts) | Current (Milliamperes) | Time (minutes) |
|---|---|---|
| 2.40 | 200 | 0 |
| 2.28 | 185 | 32 |
| 2.24 | 181 | 62 |
| 2.24 | 180 | 90 |
| 2.21 | 172 | 120 |
| 2.05 | 165 | 180 |
| 1.95 | 160 | 210 |
| 1.75 | 142 | 240 |
| 1.58 | 128 | 270 |
| 1.34 | 108 | 300 |

The above test data and Examples clearly illustrate the operability of the improved electrical energy storage battery means of the present invention.

Having thus described the invention, I claim:

1. An improved electrical energy storage battery means comprising:
    a. a case means;
    b. at least two porous electrolyte container means positioned within said case means;
    c. a solid hydrogel positioned within said case means and between said electrolyte container means, said hydrogel containing an effective amount of an electron transferring agent to render said hydrogel conductive;
    d. at least one anode means positioned within at least one of said electrolyte container means;
    e. at least one cathode means positioned within at least one of said electrolyte container means;
    f. a second solid hydrogel positioned within said container means for said cathode, said gel being saturated with a compound selected from the group consisting of zinc chloride, zinc oxide, cadmium chloride and cadmium oxide to render same conductive; and,
    g. a third solid hydrogel positioned within said container means for said anode, said gel being saturated with a compound selected from the group consisting of chromium chloride, chromium oxide, and alkali metal containing chromate salts to render same conductive.

2. The storage battery of claim 1 wherein said electron transferring agent is selected from the group consisting of an alkali metal salt, and alkali metal hydroxide, an alkaline earth metal salt, and an alkaline earth metal hydroxide.

3. The storage battery of claim 2 wherein said electron transferring agent is present is in an amount of from about 20 to 70 weight percent.

4. The storage battery of claim 1 wherein said hydrogel is selected from the group consisting of agar-agar, water glass, hydroxymethylcellulose, hydroxethylcellulose and modified cellulose.

5. The storage battery of claim 1 wherein three of said porous electrolyte container means are positioned within said case means.

6. The storage battery of claim 5 wherein said anode and cathode are provided with connecting means so that said battery can be connected to a power source and recharged.

7. The storage battery of claim 6 wherein said solid hydrogel is an agar gel saturated with sodium chloride, said second solid hydrogel is an agar gel saturated with zinc chloride, said third solid hydrogel is an agar gel saturated with chromium chloride, and said anode and cathode means are carbon plates.

8. The storage battery of claim 6 wherein said solid hydrogel is an agar gel containing about 25 weight percent sodium chloride and about 4 weight percent graphite powder, said second solid hydrogel is an agar gel saturated with zinc chloride, said third solid hydrogel is an agar solution saturated with chromium chloride and containing about 3 weight percent graphite powder, and where said anode and cathode means are carbon plates.

* * * * *